United States Patent [19]

Casavant et al.

[11] Patent Number: 5,235,417
[45] Date of Patent: Aug. 10, 1993

[54] TELEVISION SIGNAL SCAN CONVERSION SYSTEM WITH MOTION ADAPTIVE PROCESSING

[75] Inventors: Scott D. Casavant, East Windsor; Stuart S. Perlman, Princeton, both of N.J.

[73] Assignee: RCA Thomson Licensing Corporation, Princeton, N.J.

[21] Appl. No.: 858,057

[22] Filed: Mar. 26, 1992

[51] Int. Cl.⁵ .......................................... H04N 7/04
[52] U.S. Cl. .................................. 358/105; 358/142
[58] Field of Search ............. 358/140, 105, 142, 141, 358/11

[56] References Cited

U.S. PATENT DOCUMENTS

| | | | |
|---|---|---|---|
| 4,661,850 | 4/1987 | Strolle et al. | 358/140 |
| 4,933,765 | 6/1990 | Schiff et al. | 358/142 X |
| 4,979,020 | 12/1990 | Isnardi | 358/12 |
| 5,027,206 | 6/1991 | Vreeswijk et al. | 358/105 X |
| 5,029,000 | 7/1991 | Colombo | 358/105 X |
| 5,031,039 | 7/1991 | Haghiri et al. | 358/105 X |

OTHER PUBLICATIONS

"Matrix Conversion for Improvement of Vertical-Temporal Resolution in Letter-Box Wide-Aspect TV", by N. Suzuki et al., SMPTE Journal, Feb. 1991, pp. 104–110.
"Full Utilization of Signals and Transmission Spaces of NTSC TV System", by T. Fukinuki, 1991 HDTV World Conference Proceedings, pp. 65–72.
"A New System of NTSC-Compatible Wide Aspect Advanced Television-New NTSC Mode 1.5", by S. Aikoh et al., 1991 HDTV World Conference Proceedings, pp. 82–89.
"Digital EDTV", by Hee-Yong Kim et al., pre-print of paper presented at 133rd SMPTE Conference, Oct. 26–29, 1991.
"A Decoder for Letter-Box Type Wide Aspect EDTV System", by H. Ito et al., pre-print of paper presented at 133rd SMPTE Technical Conference, Oct. 26–29, 1991.
Copending Patent Application Ser. No. 720,493 filed Jul. 1, 1991, by W. Habermann et al.
Copending Patent Application Ser. No. 689,261, filed May 23, 1991, by G. Holoch.

Primary Examiner—Victor R. Kostak
Attorney, Agent, or Firm—Joseph S. Tripoli; Eric P. Herrmann; Ronald H. Kurdyla

[57] ABSTRACT

A television receiver processes a television signal representing a letterbox image display format with an image region, and a bar region containing "helper" information to help convert from interlaced to progressive scanning. An image signal processing path contains a motion detector and switch for determining whether a video processor receives image information (in the presence of motion), or field repeated information (in the absence of motion). Another motion detector associated with helper signal processing exhibits a narrower motion spreading characteristic than the motion detector in the image path, and determines when the helper signal is coupled to the image path.

11 Claims, 1 Drawing Sheet

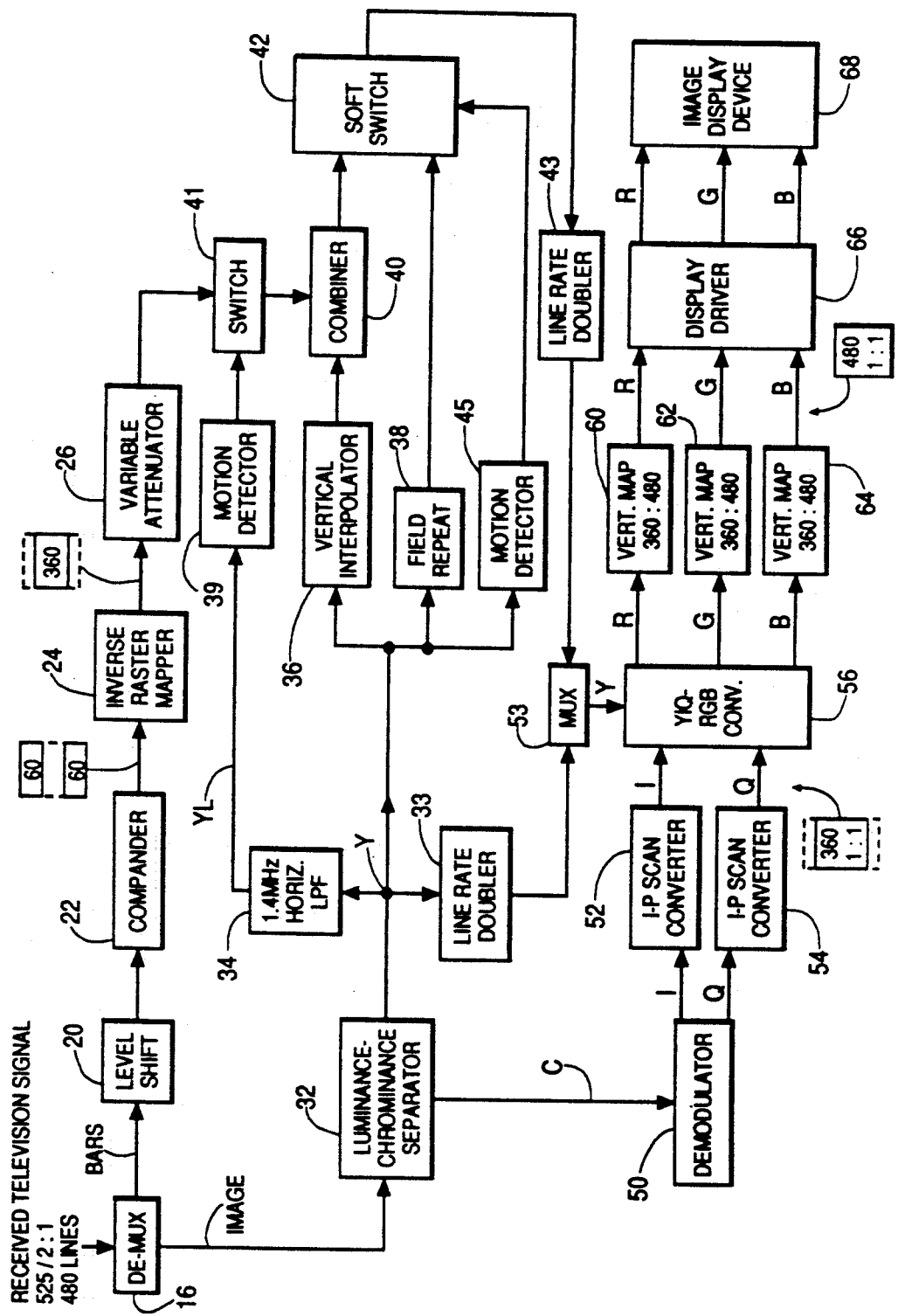

TELEVISION SIGNAL SCAN CONVERSION SYSTEM WITH MOTION ADAPTIVE PROCESSING

FIELD OF THE INVENTION

This invention concerns a system for providing a so-called helper signal to help convert a television signal from one image scanning format to another at a receiver, e.g., from interlaced to progressive scanning. In particular, this invention concerns a motion adaptive helper signal processing system.

BACKGROUND OF THE INVENTION

A conventional television receiver, such as a receiver according to NTSC broadcast standards adopted in the United States and elsewhere, displays a line interlaced image with a 4×3 aspect ratio (the ratio of the width to the height of the displayed image). Recently, significant interest has developed concerning the use of enhanced image display formats including wider image aspect ratios, e.g., 16×9 or 5×3, and progressively scanned images.

Two prominent types of compatible wide aspect ratio (widescreen) television signal processing systems are the "side panel" system and the "letterbox" system. In the side panel system, left and right image side panels are spliced to a main image panel to produce a widescreen image with a 16×9 aspect ratio. One type of NTSC compatible enhanced definition widescreen system is described in U.S. Pat. No. 4,979,020—Isnardi. The letterbox system is commonly used in Europe for television broadcasting of wide aspect ratio movies. In such case a standard 4×3 aspect ratio television receiver displays a wide aspect ratio (e.g., 16×9) with black bars appearing along the top and bottom edges of the displayed image. Although the side panel widescreen format avoids the black bars of the letterbox format, signal processing associated with the side panel format is more complex.

Both the side panel system and the letterbox system may display an image in 1:1 progressive scan (line sequential) format rather than interlaced scan format to produce what is perceived as a higher resolution display. Often this involves converting a received interlaced image signal to a progressive scan image signal with the assistance of a so-called "helper" signal. For example, in the context of a compatible letterbox system, when the original (source) image information is in progressive scan format, a letterbox encoder subsamples the progressive scan image signal to create an NTSC compatible line interlaced signal for transmission to a standard receiver. The encoder also generates a vertical helper signal prior to subsampling to help convert the compatible letterbox coded interlaced signal back to the original progressive line scan format at a widescreen progressive scan receiver. The helper signal may be transmitted in the bar regions of the compatible letterbox coded signal. At a widescreen receiver, the helper signal recovered from the bar regions allows the widescreen receiver to recover vertical resolution that would otherwise be lost in the conversion cycle from progressive scan to interlaced scan back to progressive scan. Techniques for developing and using helper signals are well known. To prevent the bar regions of a wide aspect ratio letterbox image displayed by a standard aspect ratio receiver from distracting a viewer, i.e., to reduce the visibility of the helper signal, the amplitude of the helper signal may be attenuated and shifted in a black image direction at the encoder to assure that the bar region appears black when displayed, for most if not all images. The helper signal is recovered at a widescreen receiver by performing the inverse of the attenuating and shifting operations performed at the transmitter/encoder.

A helper signal can be sufficiently degraded by noise, such as transmission channel noise for example, to adversely affect the quality of a reconstructed image displayed at a receiver. This is particularly likely to occur, for example, when the helper signal and the image signal are subjected to different types of signal processing. In the case of a letterbox system, channel noise is likely to adversely affect a helper signal compressed in the bar regions of a compatible letterbox television signal. In addition, it is herein recognized that objectionable noise may appear in motionless image areas adjacent to moving image areas. A system according to the present invention addresses this matter by motion adaptive processing of the helper signal.

SUMMARY OF THE INVENTION

In accordance with the principles of the present invention, a motion detector is associated with a helper signal processor at a television signal receiver. A control signal from the motion detector permits the use of the helper signal only when it is expected that its use will not result in a degraded image display.

In an illustrated embodiment, a received television signal is in letterbox format, with an image region and upper and lower bar regions containing a compressed helper signal. An image signal processing path contains a first motion detector for determining whether image information from the current field is conveyed to a video processor (in the presence of motion), or field repeated information is conveyed to the video processor (in the absence of motion). A helper signal processing path includes a second motion detector with a different motion spreading characteristic relative to the first motion detector. The second motion detector determines whether or not the helper signal is combined with image information.

BRIEF DESCRIPTION OF THE DRAWING

The single FIGURE shows a portion of a wide aspect ratio television receiver for processing a letterbox-type television signal by means of apparatus according to the present invention.

DETAILED DESCRIPTION

A received NTSC compatible letterbox-type television signal exhibits a 525 line, 2:1 interlaced line scan format, with 480 image lines and a 4×3 aspect ratio. Specifically, the received television signal contains a central image component representing a central image region with 360 image lines, and upper and lower bar components each representing upper and lower bar regions and comprising 60 non-image lines, for a total of 480 lines. The television signal is applied to a de-multiplexer 16 which separates the image and bar components.

The bar component from unit 16 is applied to a level shifter 20 in a helper signal processing path, including apparatus for recovering a vertical helper signal from the bar components. The vertical helper signal helps convert transmitted interlaced image information to original progressive scan form, and contains the difference between data discarded by a subsampling process at the transmitter/encoder and an estimate obtained from transmitted data. The helper signal is a low energy signal since in most cases this difference will be small. A simple helper signal (H) can be defined as $[(a+c)/2]-b$, where a, b and c are three vertically aligned pixels on three adjacent lines of an original progressive scan signal. At a receiver, pixels a and c are recovered together with helper signal H. Pixel b can be recovered by subtracting the helper signal from the average of pixels a and c, i.e., $[(a+c)/2-H$.

In this example the helper signal has been mapped into the upper and lower bar regions of the letterbox signal. Thus three helper signal lines are mapped into one bar line. This is accomplished at a transmitter/encoder by horizontally subsampling (data compressing) the signal by a factor 3:1, followed by a "cut and paste" mapping process which moves the horizontally compressed helper signal information into the bar regions. Since the original helper signal information at the transmitter exhibited a nominal gray level, the helper signal had been non-linearly amplitude compressed and level shifted in a black image direction to reduce the visibility of helper signal information in the bar regions when the letterbox signal information is displayed by a standard aspect ratio NTSC receiver.

The bar component from unit 16 is applied to a level shifter 20 in the helper signal path for shifting the average level of the bars signal component back to its original gray level. An amplitude compander 22 expands the amplitude of the bars signal by the amount that the amplitude was compressed at the encoder, whereby the original dynamic range of the helper signal information is restored. A unit 24 performs inverse raster mapping of the bars signal. Specifically, unit 24 performs the inverse of the raster mapping operation performed at the encoder, using "cut and paste" processing to move the 3:1 data compressed helper signal information from the bar regions into the original vertical position in the image. Unit 24 illustratively includes an 8-point interpolator to expand the helper signal information horizontally by a factor of three to achieve full screen line width. At this point a reconstructed 360 line, full screen width helper signal is produced.

A low energy difference type vertical helper signal, such as used in this example, usually has a magnitude in the vicinity of zero, and typically occupies 10% of the full NTSC luminance range ($-40$ to 120 IRE), even for special images containing large amounts of vertical detail. Amplitude companders at the encoder (not shown) and decoder (unit 22) exhibit complementary nonlinear mu-law companding characteristics. The compander at the encoder amplitude compresses the helper signal with a relatively linear, low compression factor (e.g., less than four, typically unity) in the vicinity of zero amplitude where most of the helper signal information is expected. Low amplitude compression in this region enables signal values to be reconstructed accurately without significantly increasing the noise. The small amount of helper signal falling outside this region is subject to heavier, nonlinear compression.

Since most of the helper signal's dynamic range is subjected to little or no compression at the encoder, associated noise in this region of the helper signal is subjected to little or no enhancement when the helper signal amplitude is expanded by unit 22. However, at the encoder any large amplitude excursions of the helper signal are subjected to significant nonlinear compression, e.g., by a factor greater than four. Thus any noise which is associated with large amplitude excursions of the helper signal, or which is itself large enough to significantly increase the magnitude of a small helper signal, is greatly amplified when such amplitude excursions are expanded by unit 22 at the decoder. Such amplified noise undesirably appears in a decoded image as a noticeably bright or dark spot approximately three pixels wide resulting from the 1:3 horizontal expansion in unit 24. Thus although the nonlinear companding action renders most of the helper signal less sensitive to noise, noise sensitivity may be increased under certain conditions as described.

A noise dependent variable attenuator 26 helps reduce the undesirable noise effects mentioned above. The gain of attenuator 26 is a function of the noise content of the received signal such that attenuator 26 exhibits substantially unity gain in response to a substantially noise-free input signal, and progressively smaller gain as input signal noise increases. Therefore in noisy conditions only a fraction of the helper signal is passed and eventually added to the image signal. The fraction of helper signal added is predetermined such that the amount of noise present in a displayed image is not expected to be objectionable. Attenuating the helper signal in this fashion is acceptable since any amount of helper signal will help reconstruct a progressive scan image signal with varying degrees of accuracy, and will generally produce a better result than not using a helper signal. Thus when the helper signal is corrupted by noise, whereby the reconstructed image is likely to contain objectionable bright/dark spots as explained, the amount of helper signal added to the image signal is reduced as determined by the amount of noise present.

Variable attenuator 26 can be made to operate as a function of noise level by employing well-known techniques. For example, attenuator 26 may include a keyed network for sampling the high frequency content of the luminance signal during a "quiet" portion of the vertical blanking interval to detect the presence of noise, a filter to develop a control voltage as a function of the magnitude of the noise-representative sampled output, and a gain control input responsive to the control voltage for adjusting the amount of attenuation as a function of the magnitude of the control voltage. The sensitivity of the helper signal to noise can be reduced further by employing a noise dependent amplitude clipper (not shown) between unit 20 and compander 22. Such a clipper is useful in connection with moderately noisy images, where only noise associated with amplitude excursions within the nonlinear, large amplification region of compander 22 produces highly objectional effects. The clipping action can be set to pass a range of small helper signal amplitudes without alteration to compander 22, while clipping amplitude excursions greater than the threshold.

The image component from demultiplexer 16, containing the central 360 image lines, is separated into a chrominance component (C) and a luminance component (Y) via a luminance-chrominance separator 32, e.g., an adaptive luminance-chrominance separator of the line comb filter type. Briefly, unit 32 samples three vertically aligned pixels from three adjacent horizontal lines. Chrominance information is combed in accordance with a programmed algorithm to provide a combed chrominance output signal for each horizontal line. The combed chrominance signal is internally subtracted from the pre-combed signal to produce the combed luminance output signal, which is substantially devoid of chrominance information. The separated luminance component is vertically interpolated by a unit 36. Specifically, unit 36 vertically averages the lines immediately above and below the line being reconstructed in the current field. The helper signal from unit 26 is combined in unit 40 with the vertically averaged lines from unit 36 to produce a reconstituted luminance image signal. The helper signal contains the difference between the data that was discarded at the encoder and the data that was transmitted, and is added to the averaged image lines to develop the original luminance information.

A "soft" switch 42 receives the luminance image information from unit 40 at one input, and field repeated luminance information from a unit 38 at another input. Unit 38 may include a field storage memory device. Unit 38 produces an output signal containing luminance information in which missing lines are obtained from, i.e., repeated form, the previous field. Thus the output signal from unit 38 includes, sequentially, line information from the current field followed by line information from the previous field, and so on. The operation of switch 42 is controlled by a control signal developed by a motion detector 45 of conventional design. Motion detector 45 senses luminance image information and exhibits a motion spreading characteristic such that motion detected in one field is spread horizontally, vertically and temporally to ensure that both slow and fast motion are detected over a prescribed HVT image volume. In this example motion detector 45 exhibits a motion spreading characteristic of approximately 5 pixels in the vertical direction (i.e., two lines above and below the subject pixel), 7 pixels in the horizontal direction (i.e., three pixels to the left and to the right of the subject pixel), and three or four fields temporally. The relative amounts of combined signal from unit 40 and signal from unit 38 is a function of the magnitude of the control signal from motion detector 45. One extreme magnitude of the control signal represents a moving image, in which case the combined signal from the current image field appears at the output of switch 42. The other extreme value of the control signal represents a motionless image, in which case the output signal from unit 38 appears at the output of switch 42. Intermediate values of the control signal cause predetermined portions of the combined and field repeated signal to appear at the output of switch 42.

When motion is sensed over an image area (actually an HVT volume) in a current field, the output luminance signal from switch 42 includes vertically averaged pixels from adjacent image lines within the current field over the motion area. The image area over which motion is sensed, and over which vertically averaged pixels from unit 36 appear, is determined by the predetermined "motion spreading" characteristic of the motion detector, typically encompassing several pixels in the horizontal and vertical directions. Although the motion spreading action may indicate motion where there is none (producing a slight but acceptable image blur), this has been found to be preferable to failing to detect motion (producing a more objectionable jagged artifact).

Switch 41, e.g., an electronic gate, responds to a control signal developed by a motion detector 39 associated with helper signal processing and is conditioned to pass the helper only when motion is detected and an effective zero value otherwise. The motion spreading characteristic of motion detector 39 is relatively narrow, encompassing approximately 3 pixels in both horizontal and vertical directions (i.e., one pixel to the left and right of the subject pixel, and one line above and below the subject pixel), and one field temporally, resulting in significantly less motion spreading than motion detector 45. The wider motion spreading by motion detector 45 results in appropriate motion detection of the image signal, while the narrower motion spreading by motion detector 39 results in the helper signal being used only when it can help improve moving portions of an image by restoring vertical detail, as will be discussed. Since detector 39 spreads motion only slightly into an area surrounding a given pixel, a noise corrupted helper signal is less likely to be added via switch 41 and combiner 40 to motionless areas of an image.

In addition, motion detector 39 responds to image information associated with a low frequency luminance component YL derived by a 0-1.4 MHz low pass filter 34, rather than broadband luminance information. This frequency selective response of motion detector 39 is dictated by the fact that, in this illustrative letterbox system, the helper signal was low pass filtered to 1.4 MHz at the transmitter/encoder. Since three full screen width vertical helper signal lines are horizontally subsampled and mapped into one bar line at the transmitter/encoder, to prevent aliasing the helper signal was low pass filtered to 1.4 MHz prior to subsampling and mapping at the encoder. A 1.4 MHz filter was chosen because the helper signal will pass through a standard 4.2 MHz NTSC channel before being received (4.2 MHz/3 = 1.4 MHz).

Motion detector 39 and switch 41 are arranged so that the helper signal from unit 26 is adaptively added to the luminance image signal in combiner 40 only when the helper signal can improve the image signal, particularly by reducing objectionable noise in still areas adjacent to moving areas. As discussed previously, the helper signal is more sensitive to noise than the main image signal due to compression of the helper signal in the bar regions of the letterbox formatted signal in this example. Thus under noisy conditions, image areas defined by vertically averaged information plus the helper signal will typically exhibit more noise artifacts due to the presence of the helper signal, compared to field repeated image areas that do not incorporate helper signal information. Because of the motion spreading action of image motion detector 45, motionless areas near moving areas will be sensed as having motion, and noise would be added to such areas if the helper signal were added to such areas. This added noise in still areas near moving areas creates an undesirable region of visible noise surrounding moving areas of the image. The amount of noise introduced into still areas sensed as having motion can be reduced by limiting the motion spreading characteristic of motion detector 45. However, this would undesirably limit the ability to detect fast motion and would result in a less acceptable conversion to progressive scan.

Since the helper signal bandwidth is limited to 1.4 MHz in this example, the helper signal cannot help recover vertical detail above 1.4 MHz. Thus when an image contains only high frequency motion, i.e., above 1.4 MHz, motion detector 39 inhibits switch 41 so that the helper signal from unit 26 is not passed to combiner 40. When noise is absent the helper signal will have no effect due to its limited bandwidth, and when noise is present the helper may corrupt the image with enhanced noise artifacts in the presence of high frequency motion. In addition, by sensing only low frequency image information, motion detector 39 is less sensitive to noise than motion detector 45, which senses a broadband luminance signal.

Although detector 45 may detect high frequency noise as motion, detector 39 would not because it senses low frequency information. When switch 41 inhibits the helper signal, a displayed image would not contain any more noise in the sensed image area, and would simply be slightly less sharp since missing line information would be reconstructed using vertical averaging without assistance from the helper signal. Because the narrow spreading action of detector 39 limits the image area which receives the helper signal, it is possible that an area of fast motion that should receive the helper signal will be deprived of it. However, even if this happens, the deprived area will be no more degraded than if the helper signal were unavailable. Thus the disclosed arrangement will not produce a result worse than that produced by an interlaced to progressive scan conversion system that lacks a helper signal. By not adding the helper signal when it is not needed, the amount of noise produced in a displayed image by a noise corrupted helper signal is significantly reduced.

The separated chrominance component (C) from unit 32 is applied to a chrominance demodulator 50 of conventional design for recovering the "I" and "Q" color difference components. Units 52 and 54 convert these components to progressive scan form by vertically averaging adjacent horizontal lines. A unit 56, e.g., a matrix network, responds to the I, Q, signals from units 52 and 54 and to the luminance output signal from switch 42 for developing image representative red, green and blue signals R, G, B. The luminance (Y) input to unit 56 is a progressive scan luminance signal provided by a time multiplexer (MUX) 53. One input of MUX 53 receives a line rate doubled ("real") luminance signal via a line doubler 33 and the output of separator 32. Another input of MUX 53 receives a line rate doubled interstitial line luminance signal via a line doubler 43 and the output of switch 42. Vertical raster mappers 60, 62 and 64 include interpolators for vertically expanding the reconstructed 360 line R, G, B image signals to full 480 image line display screen height. The R, G, B signals from units 60, 62 and 64 are each a 525 line, progressive scan, 480 image line signal, and are applied via a display driver 66 to an image display device 68 (e.g., a color kinescope).

What is claimed is:

1. In a system for receiving a television signal containing image information to be displayed and auxiliary information to help construct an image with a desired display scanning format, apparatus including
    a first path for processing said image information;
    a second path for processing said auxiliary information;
    means for combining output signals from said first and second paths for providing an output image signal; and
    a first motion detector responsive to low frequency image information for providing a control signal representing the presence of absence of image motion to said selective coupling means; wherein
    said second path includes means for selectively coupling said auxiliary information to said combining means in the presence of image motion, and for decoupling said auxiliary information from said combining means in the absence of image motion.

2. Apparatus according to claim 1 and further comprising
    a second motion detector responsive to image information for providing a control signal representing the presence or absence of image motion; and
    switch means having an input for receiving said output signal from said combining means, an input for receiving repeated image information, a control input for receiving said control signal, and an output for providing (a) said output signal from said combining means in the presence of image motion and (b) said repeated image information in the absence of image motion.

3. Apparatus according to claim 2, wherein
    said first and second motion detectors exhibit different motion spreading characteristics.

4. Apparatus according to claim 3, wherein
    said first motion detector exhibits a narrow motion spreading relative to said second motion detector.

5. Apparatus according to claim 2, wherein
    said output signal from said combining means comprises vertically averaged image information.

6. In a system for receiving a television signal representing a letterbox image display format having an image region and a bar region containing auxiliary information to help construct an image with a desired display scanning format, apparatus including
    an image signal path for processing information representing said image region;
    an auxiliary signal path for processing said auxiliary information contained in said bar region;
    means for combining output signals from said main and auxiliary paths for providing an output image signal; and
    wherein
    said auxiliary path includes means for selectively coupling said auxiliary information to said combining means in the presence of image motion, and for decoupling said auxiliary information from said combining means in the absence of image motion.

7. Apparatus according to claim 6 and further including
    a first motion detector responsive to low frequency image information for providing a control signal representing the presence or absence of image motion to said selective coupling means.

8. Apparatus according to claim 7 and further comprising
    a second motion detector responsive to image information for providing a control signal representing the presence or absence of image motion; and
    switch means having an input for receiving said output signal from said combining means, an input for receiving repeated image information, a control input for receiving said control signal, and an output for providing to (a) said output signal from said combining means in the presence of image motion and (b) said repeated image information in the absence of image motion.

9. Apparatus according to claim 8, wherein
    said first and second motion detectors exhibit different motion spreading characteristics.

10. Apparatus according to claim 9, wherein
    said first motion detector exhibits a narrow motion spreading relative to said second motion detector.

11. Apparatus according to claim 8, wherein
    said output signal from said combining means comprises vertically averaged image information.

* * * * *